March 8, 1938. L. G. DANIELS 2,110,758
WATER SOFTENER VALVE
Filed Nov. 20, 1933 2 Sheets-Sheet 2

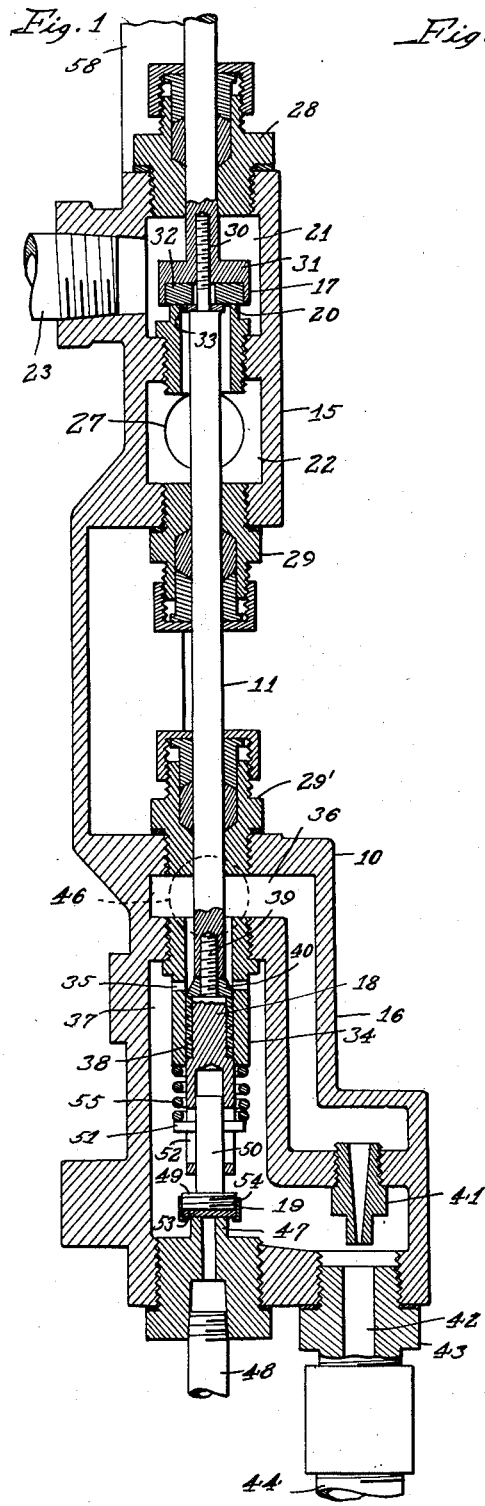

Inventor
Lee G. Daniels
By
Wilson, Bowell, McCanna & Wintercorn
Attys.

Patented Mar. 8, 1938

2,110,758

UNITED STATES PATENT OFFICE 2,110,758

WATER SOFTENER VALVE

Lee G. Daniels, Rockford, Ill.

Application November 20, 1933, Serial No. 698,829

30 Claims. (Cl. 277—1)

This invention relates to valves generally and has particular reference to an improved multiple port valve, especially designed for use with a base exchange water softener, but, of course, adapted for other uses, wherever a similar flow control is desired.

One of the principal objects of this invention is to provide a single valve to which all of the pipes of the softener and brine tank are arranged to be connected for the control of the flow of water and brine in the operation of the softener, the single valve being of simple and economical construction and taking the place of a number of valves and permitting of more convenient automatic operation by simple reciprocatory movement of the single stem thereof.

Another object is to provide a valve having three operating positions, one for the normal softening operation, another for salt wash and a third for rinsing, the valve stem being movable from the first position to an opposite extreme for the second position and part way back again for the third position, such operation making the valve well adapted to use with automatic control mechanism.

The invention is illustrated in the accompanying drawings, in which—

Figure 1 is a longitudinal section through a water softener valve made in accordance with my invention showing the parts in softening position;

Figs. 2 and 3 are fragmentary sectional details sufficient to show the parts in salt wash and rinse positions, respectively;

The same reference numerals are applied to corresponding parts throughout the views.

Figure 4:
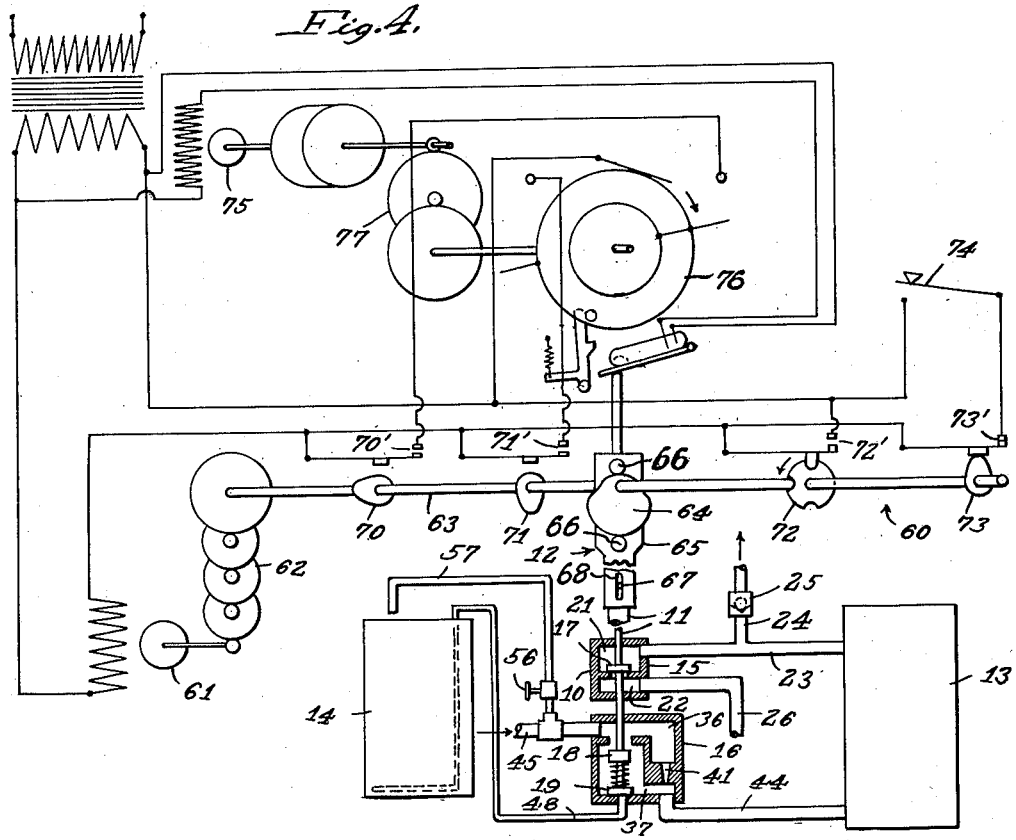
Fig. 4 is a diagrammatic view showing the valve of my invention in connection with an automatic water softener installation.
Figure 5:
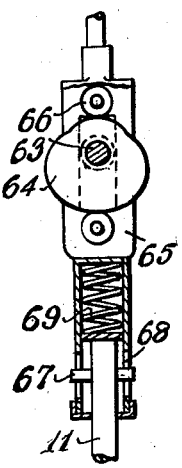
Fig. 5 is a sectional detail of a portion of Fig. 4 illustrating the valve actuating spring provided in connection with the cam operated valve actuating plunger.

Referring first to Figs. 1–4, for an understanding of the valve and its various connections. The numeral 10 designates the one-piece elongated body of the valve and 11 is the single stem extending lengthwise of the body and projecting from the upper end thereof for reciprocatory movement which may be communicated thereto by hand or otherwise. In Fig. 4, a control mechanism, indicated generally by the numeral 12, is illustrated to operate the valve automatically, or more specifically semi-automatically, inasmuch as the specific mechanism herein disclosed depends upon the operator closing a switch to throw the softener into regeneration. Of course, there are also numerous ways of taking care of the closing of the switch automatically, as for example, by means of a clock. At 13 I have indicated a softener tank and at 14 a brine tank. The valve body 10 has upper and lower hollow casing portions 15 and 16 providing passages therein for controlling the flow of water and brine through the softener in accordance with the positions of the valve stem 11 which determines the closing and opening of the three valve members, numbered 17–19, carried on said stem. The valve 17 is a poppet type valve rigid with the stem and arranged to engage a seat 20 to close off communication between chambers 21 and 22 in the casing 15. A pipe 23 communicates with the chamber 21 and has connection with the top of the softener tank 13 as well as with the service pipe 24. A check valve 25 is preferably provided in the service pipe seating in the direction of the softener. A pipe 26 communicates with the chamber 22 through the opening 27 and leads to the sewer, or any suitable drain receptacle. There are stuffing boxes 28 and 29 at the opposite ends of the casing 15 for the extension therethrough of the valve stem 11 without leakage, and a similar stuffing box 29' for a like purpose on the casing 16 where the valve stem extends into the latter. The stem 11, it will be noticed, is made in sections screwed together, as indicated at 30, whereby to make for greater economy in construction and facilitate assembling. The disc 31 for the valve 17 is formed integral with one section of the stem and is hollowed out to receive a rubber gasket 32 for engagement with the valve seat 20. The gasket is held in place by a washer 33 when the valve stem sections are screwed together.

The valve 18 is a plunger or piston type valve which works in a bushing 34 mounted in the casing 16 and provided with radial holes 35 in the wall thereof through which communication may be established between the passage 36 and chamber 37 in the casing 16 when the valve 18 is open, as in Figure 1. The valve 18 is made up of a number of leather washers 38 carried on a reduced portion of a lower valve stem section which is arranged to screw into the middle section, as at 39. A tapered washer 40 is clamped between the valve stem sections at the threaded connection and holds the leather washers under compression. An injector nozzle 41 has its inlet end communicating with the passage 36. This nozzle discharges into the bore 42 of a nipple 43 threaded into the lower end of the casing 16 in communication with the bottom of the chamber 37. A pipe 44 extends from the nipple 43 to the bottom of the softener 13. Hard water is supplied through a pipe 45 threaded into an opening 46 in the upper end of the casing 16 communicating with the passage 36.

The valve 19 is a poppet type valve arranged to engage a seat 47 to close off communication between the chamber 37 in the casing 16 and a pipe 48 communicating with the bottom of the brine tank 14. The valve 19 consists of a disc 49 on the end of a stem 50 reciprocable in a bore in the lower end of the valve stem 11 and having a cross-pin 51 projecting through slots 52 in the stem 11, whereby the valve 19 has a lost motion connection with the stem 11. A gasket disc 53 of rubber or other suitable material is clamped on the disc 49 by means of the nut 54 and is arranged to engage the valve seat 47. A coiled compression spring 55 surrounds the lower end of the valve stem 11 and at its upper end engages the bottom of the bushing 34, and at its lower end the cross-pin 51, whereby to urge the valve 19 normally downwardly with respect to the valve stem 11 toward the seat 47. Of course, when the cross-pin 51 reaches the lower end of the slots 52, further movement of the valve 19 under the action of the spring 55 is prevented and under those circumstances the valve 19 may be raised with the stem 11, as appears in Fig. 2.

In operation, assuming the valve is in softening position, as shown in Figures 1 and 4, hard water supplied through the pipe 45 flows through passage 36 and chamber 37 to the pipe 44 and enters the bottom of the softener 13 for passage upwardly through the zeolite therein. The softened water leaves the top of the softener 13 through pipe 23 and is delivered to the service system through pipe 24 which branches off from the pipe 23. When the zeolite in the softener requires regeneration the valve stem 11 is moved to the position shown in Fig. 2 for the salt wash, unseating valves 17 and 19 and closing valve 18. Under these conditions, the valve 18 being closed, the hard water supplied through pipe 45 flows through passage 36 and is discharged through the injector nozzle 41. The injector action results in a reduction in pressure in the chamber 37 sufficient to draw brine from the tank 14 through the pipe 48 past the open valve 19, and this brine is delivered by the hard water through the pipe 44 to the bottom of the softener 13 for passage upwardly through the zeolite for regeneration of the latter. The waste water containing released calcium and magnesium from the zeolite leaves the top of the softener through pipe 23 and is carried to the drain through pipe 26 past the open valve 17. It is during this operation that the check valve 25 functions to prevent draining water from the service system through pipes 23 and 26. After a predetermined amount of brine has been passed through the softener, the amount being predetermined as hereinafter explained by the continuance of the salt wash for a predetermined period of time, the valve stem 11 is moved to the rinse position shown in Fig. 3, closing the valve 19 but leaving the valve 17 open and valve 18 closed. Under these conditions, the hard water delivered through pipe 45 is conducted through pipe 44 to the bottom of the softener 13 without entraining any brine, due to the fact that the valve 19 has been closed to cut off communication with the brine tank 14. The hard water passing up through the zeolite in the softener rinses out the brine and any remaining released calcium and magnesium and is conducted through pipes 23 and 26 to the drain. After a predetermined period of rinsing, the valve stem 11 is moved back to the position shown in Figure 1 for softening operation, closing the valve 17 and opening the valve 18, and, of course, leaving the brine valve 19 closed. Upflow is used in all operations of softening, salt washing, and rinse. It is, of course, apparent that by simply reversing the connections of pipes 23 and 44 with the softener 13 one would secure downflow softening, downflow salt washing, and downflow rinsing. Any suitable provision may be made for maintaining a certain level in the brine tank 14. A hand operated valve is shown at 56 which can be opened to conduct hard water from the supply pipe 45 through the pipe 57 discharging into the brine tank 14.

The valve is usually supported by means of its pipe connections with the softener but, of course, may be secured to the wall adjacent the softener if desired. Arms 58, preferably cast integral with the body 10 of the valve, support a motor driven mechanism 60 for power operation of the valve 11 secured thereon. The mechanism 60 is a part of the control mechanism previously referred to and designated generally by the reference numeral 12. This mechanism forms the subject matter of a divisional application Serial No. 159,736, filed August 18, 1937. Briefly stated, this mechanism comprises a motor 61 which, through reduction gearing 62, is adapted to intermittently communicate rotation to the shaft 63, whereby to turn a cam 64 provided for moving the valve stem 11. A plunger 65 has rollers 66 thereon riding on the periphery of the cam 64, and the lower end of the plunger is made tubular to receive and make connection with the upper end of the valve stem 11. A cross-pin 67 on the stem extends through slots 68 in the side walls of the tubular portion of the plunger to provide a lost motion operating connection. A coiled compression spring 69 fitting in the tubular portion of the plunger engages the upper end of the stem 11 and tends normally to urge it downwardly, whereby to hold the valve 17 seated under a certain pressure. When the plunger 65 is moved upwardly by the turning of the cam 64 with the shaft 63 the cross-pin 67 reaches the lower end of the slots 68 so that the valve stem is moved upwardly with the plunger. Contrariwise when the plunger moves downwardly, the valve stem 11 moves with it up to the time that the valve 17 engages it seat, after which the further movement of the plunger merely places the spring 69 under additional compression so as to increase the pressure applied to the valve 17, holding the same seated. There are four other cams 70–73 on the shaft 63. These turn with the shaft in the turning of the cam 64 and are arranged to operate contacts 70'–73' for controlling the electric circuit for the motor 61. The cam 72 differs from the other cams 70, 71 and 73 in that it is circular and has three notches provided in the periphery thereof into which the follower for the contacts 72' is arranged to drop, as shown in Fig. 4, to break the motor circuit. While the follower is riding on the periphery of this cam from one notch to another, the motor circuit is kept intact. This cam, therefore, predetermines the stopping of the motor; the other three cams, as will soon appear, control the starting of the motor. It will be observed that the three notches in the cam 72 are 90° apart and, noting the direction of rotation indicated by the arrow, it follows that once the motor starts to operate from the position shown, the first operation will be sufficient to move the cam 64 through 180°. Then, on the next operation, the cam 64 will be moved 90°, and on the following operation another 90° back to its starting point. In the 180° of movement of the cam 64, the valve stem 11 is moved to the position shown in Fig. 2 for salt wash. In the following 90° of movement, the cam 64 moves the valve stem 11 back again part way toward its original position to the position shown in Fig. 3 for rinse, and in the following 90° of movement the cam 64 moves the valve stem 11 the rest of the way to its original position shown in Figure 1, for softening. There are numerous ways of causing the motor 61 to go through the three operations to move the valve from softening to salt wash, from salt wash to rinse, and from rinse back to softening position. I prefer a semi-automatic mechanism in which a switch 74 is closed by the operator to start the cycle when it becomes apparent that the softener requires regeneration, but, instead of having a manually operated switch some means such as a clock might be provided for automatically starting the cycle or some other means of an automatic character might be provided for closing the circuit either when a predetermined amount of water has been softened or when the outgoing water shows signs of hardness. The additional mechanism for initiating the second and third operations of the motor 61, following this first mentioned operation, can also take various forms, but I prefer a mechanism using a self-starting clock type motor 75 driving a timer 76 through suitable reduction gearing 77. This mechanism need not be described in detail here, inasmuch as it is fully disclosed in the divisional application.

It is believed the foregoing description conveys a good understanding of my invention. The appended claims have been drawn with a view to covering all legitimate modifications and adaptations.

I claim:

1. A water softener valve comprising a body having two chambers provided therein, one having an outlet port and the other having a waste port, the body having two other chambers provided therein, one having a water supply port and the other having a brine port, the last-mentioned chamber having also an outlet port, an injector arranged to discharge into said second mentioned outlet port from the other chamber, a valve controlling communication between the first mentioned two chambers, another valve for controlling communication between the last two mentioned chambers, a single reciprocable valve stem having the valves movable therewith for simultaneous operation and for holding the one valve open while the other is closed, and a third valve for closing and opening the brine port, said last mentioned valve having a lost motion operating connection with the aforesaid valve stem whereby to permit a predetermined movement of the other two valves independently of the third valve.

2. A water softener valve comprising a body having two chambers provided therein, one having an outlet port and the other having a waste port, the body having two other chambers provided therein, one having a water supply port and the other having a brine port, the last-mentioned chamber having also an outlet port, an injector arranged to discharge into said second mentioned outlet port from the other chamber, a valve controlling communication between the first mentioned two chambers, a sliding valve for controlling communication between the other two chambers, a single reciprocable valve stem interconnecting said valves for simultaneous operation in such a way that the second valve is open when the first is closed, and the second is closed in either of two open positions of the first valve, and a brine valve for opening and closing the brine port having a lost motion operating connection with the aforesaid valve stem so as to be opened in one of the two open positions of the first valve and closed otherwise.

3. A valve as set forth in claim 2 including spring means tending normally to move the brine valve relative to the valve stem toward closed position.

4. A valve as set forth in claim 2 including spring means tending normally to move the brine valve relative to the valve stem toward closed position, and another spring means tending normally to move the valve stem in one direction to close the first valve.

5. A water softener valve comprising a body having two chambers provided therein, one having an outlet port and the other having a waste port, the body having two other chambers provided therein, one having a water supply port and the other having a brine port, the last-mentioned chamber having also an outlet port, an injector arranged to discharge into said second mentioned outlet port from the other chamber, a valve seat surrounding an opening establishing communication between the first two chambers, a poppet type valve movable in a direction to engage the seat to close communication between said chambers, a valve seat surrounding the brine port, another poppet type valve movable in the same direction as the first valve to engage said seat to close the brine port, a ported sleeve through which communication is established between the other two chambers, a plunger valve slidable in said sleeve to control communication between said chamber, and a single valve stem rigidly connecting the first valve with the third valve for simultaneous reciprocation and having a lost motion operating connection with the second valve, said valve stem and lost motion connection being arranged so that the third valve is open when the first is closed and the third is closed in two different degrees of opening of the first valve, and the second valve is open only in the extreme open position of the first valve.

6. A valve as set forth in claim 5 including spring means acting to normally urge the second valve in one direction with respect to the valve stem toward closed position.

7. A valve as set forth in claim 5 including spring means acting to normally urge the second valve in one direction with respect to the valve stem toward closed position, and another spring means for normally urging the valve stem in one direction to close the first valve.

8. A multiple port valve comprising a body having three coaxially aligned and spaced valve ports provided therein, a reciprocable valve stem projecting through one end of said body through said ports toward the third port, a valve disc on said stem movable with the stem toward and away from the first port to close and open the same, a valve plunger on said stem movable in the second port with the stem to open and closed positions, and another valve disc movable with the valve stem toward and away from the third port to open and close the same, the last mentioned valve having a lost motion operating connection with the stem, there being pipes communicating with the body above and below the first port, another pipe communicating with the body above the second port and two other pipes communicating with the body below the third port, the one communicating with the body through said port and the other independently of said port.

9. A valve as set forth in claim 8 including an injector communicating with the pipe above the second port and discharging into the last mentioned pipe so as to exert an injector action on the third port when the third valve is opened.

10. In combination in a multiple port valve, a single reciprocating stem adapted for moving two poppet valves carried on the stem toward and away from two axially spaced seats provided therefor, and one plunger type valve on the stem between said poppet valves slidable in a port provided therefor between the first two ports, and means for moving and holding the stem in different positions.

11. A valve comprising a body having two chambers provided therein, each having a port in the wall thereof adapted to receive a pipe connection, the body having two other chambers provided therein, the one having a port in the wall thereof for a pipe connection and the other having first and second ports for pipe connections, an injector discharging into the first of the aforesaid two ports from the other chamber, a valve controlling communication between the first mentioned two chambers, another valve for controlling communication between the last two mentioned chambers, a single reciprocable valve stem having the valves movable therewith for simultaneous operation and for holding the one valve open while the other is closed, and a third valve for closing and opening the second of the aforesaid two ports, said last mentioned valve having a lost motion operating connection with the aforesaid valve stem whereby to permit a predetermined movement of the other two valves independently of the third valve.

12. A valve comprising a body having two chambers provided therein, each having a port in the wall thereof, the body having two other chambers provided therein, the one having a port in the wall thereof for a pipe connection and the other having two ports for pipe connections, an injector discharging into the first of the aforesaid two ports from the other chamber, a valve controlling communication between the first mentioned two chambers, a sliding valve for controlling communication between the other two chambers, a single reciprocable valve stem interconnecting said valves for simultaneous operation in such a way that the second valve is open when the first is closed, and the second is closed in either of two open positions of the first valve, and a third valve for opening and closing the second of the aforesaid two ports having a lost motion operating connection with the aforesaid valve stem so as to be opened in one of the two open positions of the first valve and closed otherwise.

13. A valve as set forth in claim 12 including spring means tending normally to move the third valve relative to the valve stem toward closed position.

14. A valve as set forth in claim 12 including spring means tending normally to move the third valve relative to the valve stem toward closed position, and another spring means tending normally to move the valve stem in one direction to close the first valve.

15. A valve comprising a body having two chambers provided therein, each having a port in the wall thereof adapted to receive a pipe connection, the body having two other chambers provided therein, the one having a port in the wall thereof for a pipe connection and the other having two ports for pipe connections, an injector discharging into the first of the aforesaid two ports from the other chamber, a valve seat surrounding an opening establishing communication between the first two chambers, a poppet type valve movable in a direction to engage the seat to close communication between said chambers, a valve seat surrounding the second of the aforesaid two ports, another poppet type valve movable in the same direction as the first valve to engage said seat to close said port, a ported sleeve through which communication is established between the second two chambers, a plunger valve slidable in said sleeve to control communication between said chambers, and a single valve stem rigidly connecting the first valve with the third valve for simultaneous reciprocation and having a lost motion operating connection with the second valve, said valve stem and lost motion connection being arranged so that the third valve is open when the first is closed and the third is closed in two different degrees of opening of the first valve, and the second valve is open only in the extreme open position of the first valve.

16. A valve as set forth in claim 15 including spring means acting to normally urge the third valve in one direction with respect to the valve stem toward closed position.

17. A valve as set forth in claim 15 including spring means acting to normally urge the third valve in one direction with respect to the valve stem toward closed position, and another spring means for normally urging the valve stem in one direction to close the first valve.

18. A multiple port valve comprising a body having three coaxially aligned and spaced valve ports provided therein, a reciprocable valve stem projecting through one end of said body through said ports toward the third port, a valve disc on said stem movable with the stem toward and away from the first port to close and open the same, a valve plunger on said stem movable in the second port with the stem to open and closed positions, another valve disc movable with the valve stem toward and away from the third port to open and close the same, the last mentioned valve having a lost motion operating connection with the stem, there being pipes communicating with the body above and below the first port, another pipe communicating with the body above the second port and two other pipes communicating with the body below the third port, the one communicating with the body through said port and the other independently of said port, and spring means acting to normally urge the last mentioned valve disc in one direction with respect to the valve stem toward closed position.

19. A multiple port valve comprising a body having three coaxially aligned and spaced valve ports provided therein, a reciprocable valve stem projecting through one end of said body through said ports toward the third port, a valve disc on said stem movable with the stem toward and away from the first port to close and open the same, a valve plunger on said stem movable in the second port with the stem to open and closed positions, another valve disc movable with the valve stem toward and away from the third port to open and close the same, the last mentioned valve having a lost motion operating connection with the stem, there being pipes communicating with the body above and below the first port, another pipe communicating with the body above the second port and two other pipes communicating with the body below the third port, the one communicating with the body through said port and the other independently of said port, spring means acting to normally urge the last mentioned valve disc in one direction with respect to the valve stem toward closed position, and another spring means for normally urging the valve stem in one direction to close the first mentioned valve disc on the first port.

20. A valve of the character described comprising an elongated hollow body having three coaxially aligned and spaced valve ports provided therein, a single elongated valve stem movable endwise in and relative to the body, and three valve elements thereon in coaxially spaced relation for cooperation with the ports in different positions of the stem, the valve elements being differently spaced than the ports, whereby one or two ports are left open in each of three different operating positions of the valve stem, one of the valve elements being mounted for endwise movement relative to the stem.

21. A valve of the character described comprising an elongated hollow body having three coaxially aligned and spaced valve ports provided therein, a single elongated valve stem movable endwise in and relative to the body, and three valve elements thereon in coaxially spaced relation for cooperation with the ports in different positions of the stem, the valve elements being differently spaced than the ports, whereby one or two ports are left open in each of three different operating positions of the valve stem, one of the valve elements being mounted for endwise movement relative to the stem, the valve including spring means normally tending to move the valve element in one direction to a limit position.

22. A valve comprising two spaced casings substantially coaxially arranged, the one having stuffing boxes in its opposite ends and the other having a stuffing box in the end toward the first casing, the three stuffing boxes being coaxially arranged, a valve operating rod extending longitudinally through the first casing into the second casing and slidably received in the aforesaid stuffing boxes, valve openings provided in the two casings in coaxial relation with said rod, and valve members on said rod in the two casings for opening and closing the valve openings in the reciprocatory movement of said rod.

23. A multiple port valve comprising a body having three coaxially aligned and spaced valve ports provided therein, a reciprocable valve stem projecting through one end of said body through said ports toward the third port, a valve disc on said stem movable with the stem toward and away from the first port to close and open the same, a valve plunger on said stem movable in the second port with the stem to open and closed positions, and another valve disc movable with the valve stem toward and away from the third port to open and close the same, there being pipes communicating with the body above and below the first port, another pipe communicating with the body above the second port and two other pipes communicating with the body below the third port, the one communicating with the body through said port and the other independently of said port.

24. A valve as set forth in claim 23, including an injector communicating with the pipe above the second port and discharging into the last-mentioned pipe so as to exert an injector action on the third port when the third valve is opened.

25. A multiple port valve comprising a body having three coaxially aligned and spaced valve ports provided therein, a reciprocable valve stem projecting through one end of said body through said ports toward the third port, a valve disc on said stem movable with the stem toward and away from the first port to close and open the same, a valve plunger on said stem movable in the second port with the stem to open and closed positions, and another valve disc movable with the valve stem toward and away from the third port to open and close the same, there being pipes communicating with the body above and below the first port, another pipe communicating with the body above the second port and a pipe communicating with the body below the third port.

26. A valve comprising a body having two chambers provided therein, each having a port in the wall thereof adapted to receive a pipe connection, the body having two other chambers provided therein, the one having a port in the wall thereof for a pipe connection and the other having first and second ports for pipe connections, an injector discharging into the first of the aforesaid two ports from the other chamber, a valve controlling communication between the first mentioned two chambers, another valve for controlling communication between the last two mentioned chambers, a single reciprocable valve stem having the valves movable therewith for simultaneous operation and for holding the one valve open while the other is closed, and a third valve for closing and opening the second of the aforesaid two ports.

27. A valve comprising a body having two chambers provided therein, each having a port in the wall thereof, the body having two other chambers provided therein, the one having a port in the wall thereof for a pipe connection and the other having two ports for pipe connections, an injector discharging into the first of the aforesaid two ports from the other chamber, a valve controlling communication between the first mentioned two chamber, a sliding valve for controlling communication between the other two chambers, a single reciprocable valve stem interconnecting said valves for simultaneous operation in such a way that the second valve is open when the first is closed, and the second is closed in either of two open positions of the first valve, and a third valve for opening and closing the second of the aforesaid two ports in a predetermined relation to the operation of the first valve.

28. A valve comprising a body having two chambers provided therein, each having a port in the wall thereof adapted to receive a pipe connection, the body having two other chambers provided therein, the one having a port in the wall thereof for a pipe connection and the other having two ports for pipe connections, an injector discharging into the first of the aforesaid two ports from the other chamber, a valve seat surrounding an opening establishing communication between the first two chambers, a poppet type valve movable in a direction to engage the seat to close communication between said chambers, a valve seat surrounding the second of the aforesaid two ports, another poppet type valve movable in the same direction as the first valve to engage said seat to close said port, a ported sleeve through which communication is established between the second two chambers, a plunger valve slidable in said sleeve to control communication between said chambers, and a single valve stem rigidly connecting the first valve with the third valve for simultaneous reciprocation and having operating connection with the second valve, said valve stem and connection being arranged so that the third valve is open when the first is closed and the third is closed in two different degrees of opening of the first valve, and the second valve is open only in the extreme open position of the first valve.

29. A multiple port valve comprising a body having three coaxially aligned and spaced valve ports provided therein, a reciprocable valve stem projecting through one end of said body through said ports toward the third port, a valve disc on said stem movable with the stem toward and away from the first port to close and open the same, a valve plunger on said stem movable in the second port with the stem to open and closed positions, another valve disc movable with the valve stem toward and away from the third port to open and close the same, the last mentioned valve having operating connection with the stem, there being pipes communicating with the body above and below the first port, another pipe communicating with the body above the second port and two other pipes communicating with the body below the third port, the one communicating with the body through said port and the other independently of said port.

30. A multiple port valve comprising a body having three coaxially aligned and spaced valve ports provided therein, a reciprocable valve stem projecting through one end of said body through said ports toward the third port, a valve disc on said stem movable with the stem toward and away from the first port to close and open the same, a valve plunger on said stem movable in the second port with the stem to open and closed positions, another valve disc movable with the valve stem toward and away from the third port to open and close the same, the last mentioned valve having operating connection with the stem, there being pipes communicating with the body above and below the first port, another pipe communicating with the body above the second port and two other pipes communicating with the body below the third port, the one communicating with the body through said port and the other independently of said port, and spring means for normally urging the valve stem in one direction to close the first mentioned valve disc on the first port.

LEE G. DANIELS.